(12) United States Patent
Kawai et al.

(10) Patent No.: US 11,932,178 B2
(45) Date of Patent: Mar. 19, 2024

(54) SOUND-ABSORBING MATERIAL

(71) Applicants: IBIDEN CO., LTD., Ogaki (JP); TOYOTA JIDOSHA KABUSHIKI KAISHA, Toyota (JP)

(72) Inventors: Takanori Kawai, Ogaki (JP); Tomoki Mabuchi, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 17/283,251

(22) PCT Filed: Nov. 14, 2019

(86) PCT No.: PCT/JP2019/044680
§ 371 (c)(1),
(2) Date: Apr. 7, 2021

(87) PCT Pub. No.: WO2020/100974
PCT Pub. Date: May 22, 2020

(65) Prior Publication Data
US 2021/0339687 A1 Nov. 4, 2021

(30) Foreign Application Priority Data
Nov. 16, 2018 (JP) ................. 2018-215650

(51) Int. Cl.
*B60R 13/08* (2006.01)
*B32B 3/26* (2006.01)
(Continued)

(52) U.S. Cl.
CPC .......... *B60R 13/0838* (2013.01); *B32B 3/266* (2013.01); *B32B 5/022* (2013.01);
(Continued)

(58) Field of Classification Search
CPC ............ B60R 13/0838; B60R 13/0876; G10K 11/168; B32B 5/266; B32B 5/022;
(Continued)

(56) References Cited

U.S. PATENT DOCUMENTS 4,340,129 A * 7/1982 Salyers ................ G10K 11/168
181/290
4,487,793 A * 12/1984 Haines, Jr. ........... G10K 11/172
181/290
(Continued)

FOREIGN PATENT DOCUMENTS

CN 2196656 Y 5/1995
CN 1448603 10/2003
(Continued)

*Primary Examiner* — Forrest M Phillips
(74) *Attorney, Agent, or Firm* — MORI & WARD, LLP

(57) ABSTRACT

The present invention provides a sound-absorbing material having sound absorption performance with an average sound absorption coefficient of 0.70 or more in the frequency range of 800 to 5000 Hz. The present invention provides a sound-absorbing material including: a fiber layer including a plurality of holes open to a surface thereof and having a thickness of 3 mm or more; and an inorganic material layer mainly containing a calcium-based material and having a thickness of 0.4 to 0.6 mm on the surface of the fiber layer, the holes being blind holes each penetrating through the inorganic material layer and having a bottom inside the fiber (Continued)

layer, each hole having a depth corresponding to 50 to 90% of the thickness of the fiber layer.

8 Claims, 5 Drawing Sheets

(51) Int. Cl.
*B32B 5/02* (2006.01)
*B32B 5/26* (2006.01)
*F02B 77/13* (2006.01)
*G10K 11/168* (2006.01)

(52) U.S. Cl.
CPC .......... *B32B 5/266* (2021.05); *B60R 13/0876* (2013.01); *F02B 77/13* (2013.01); *G10K 11/168* (2013.01); *B32B 2255/02* (2013.01); *B32B 2255/20* (2013.01); *B32B 2307/102* (2013.01); *B32B 2307/732* (2013.01)

(58) Field of Classification Search
CPC . B32B 3/266; B32B 2255/02; B32B 2255/20; B32B 2307/102; B32B 2307/732; F02B 77/13
See application file for complete search history.

(56) References Cited

U.S. PATENT DOCUMENTS

| | | | | |
|---|---|---|---|---|
| 6,202,786 | B1 * | 3/2001 | Pfaffelhuber | B29C 51/16 181/290 |
| 7,913,813 | B1 * | 3/2011 | Mathur | G10K 11/172 181/290 |
| 8,789,651 | B2 * | 7/2014 | Kawai | G10K 11/172 181/290 |
| 2005/0227104 | A1 | 10/2005 | Kim et al. | |
| 2007/0102237 | A1 * | 5/2007 | Baig | E04B 1/8409 181/290 |
| 2014/0302279 | A1 | 10/2014 | Pfaffelhuber et al. | |

FOREIGN PATENT DOCUMENTS

| | | | |
|---|---|---|---|
| CN | 204804236 U | 11/2015 | |
| EP | 3605523 | 2/2020 | |
| JP | 2000-034938 | 2/2000 | |
| JP | 2018-158691 | 10/2018 | |
| WO | WO-2012008225 A1 * | 1/2012 | ........... E04B 1/8409 |
| WO | WO 2018/174174 | 9/2018 | |

* cited by examiner

SOUND-ABSORBING MATERIAL

TECHNICAL FIELD

The present invention relates to a sound-absorbing material.

BACKGROUND ART

Automobiles include power sources such as engines and motors. Operation of these power sources generates various sounds, and such sounds are transferred to the vehicle interior. Sounds transferred to the vehicle interior include not only sounds generated by the vehicle itself but also sounds such as road noise and wind noise generated outside the vehicle during driving. In some cases, these sounds are mixed and produce a sound having a frequency unpleasant to the human ear, i.e., a sound having a frequency of 800 to 2000 Hz.

Thus, soundproofing measures by sound insulation and/or sound absorption are taken in or around an engine, engine room, vehicle body, exhaust pipe, or the like.

As such soundproofing measures, Patent Literature 1 discloses use of a sound absorption device in an automobile, wherein the sound absorption device includes a sound insulation board and a sound absorption unit that includes a stack of metal foil and a highly breathable fiber mat, the metal foil including numerous holes each having an area of 3 $mm^2$ or less and having an opening ratio of 1 to 30%. On the side opposite to the metal foil, a gap is formed between the sound absorption unit and the sound insulation board, and the sound absorption device is disposed with the metal foil facing the engine.

CITATION LIST

Patent Literature

Patent Literature 1: JP 2000-34938 A

SUMMARY OF INVENTION

Technical Problem

In order to prevent interference of noise with conversation in the vehicle, a sound-absorbing material for automobiles to be used around the exhaust pipe or engine of an automobile is required to function as a sound-absorbing material in the frequency range of 500 to 2000 Hz which is the speech range.

In particular, sound in the frequency range of 800 to 2000 Hz is unpleasant to the human ear, so that an improvement in sound absorption performance of the sound-absorbing material in this frequency range has been especially sought in order to improve vehicle comfortableness.

In recent years, while absorption of sound in the frequency range of 800 to 2000 Hz has been improved, attenuation of the sound in the above frequency range has made sound in the frequency range of 2000 to 5000 Hz more audible. Thus, there has been an increasing demand for absorption of the sound in the frequency range of 2000 to 5000 Hz.

A sound-absorbing material described in an example of Patent Literature 1 was used to measure sound absorption performance. The results showed insufficient sound absorption performance with an average sound absorption coefficient of less than 0.70 in the low frequency range of 800 to 5000 Hz.

The present invention was made to solve the above problem, and aims to provide a sound-absorbing material having sound absorption performance with an average sound absorption coefficient of 0.70 or more in the frequency range of 800 to 5000 Hz.

Solution to Problem

The present invention provides a sound-absorbing material including: a fiber layer including a plurality of holes open to a surface thereof and having a thickness of 3 mm or more; and an inorganic material layer mainly containing a calcium-based material and having a thickness of 0.4 to 0.6 mm on the surface of the fiber layer, the holes being blind holes each penetrating through the inorganic material layer and having a bottom inside the fiber layer, each hole having a depth corresponding to 50 to 90% of the thickness of the fiber layer.

In the sound-absorbing material of the present invention, the fiber layer has a thickness of 3 mm or more.

A fiber layer having a thickness of less than 3 mm is too thin to absorb the sound, making it difficult to achieve sufficient sound absorption performance.

The sound-absorbing material of the present invention includes a plurality of holes open to the surface of the fiber layer, and the holes are blind holes each penetrating through the inorganic material layer and having a bottom inside the fiber layer.

When the sound-absorbing material receives sound, sound is incident to the holes open to the surface of the fiber layer. The sound is reflected and attenuated in the holes and absorbed in the fiber layer, whereby sound absorption is achieved.

In the present invention, the surface of the inorganic fiber layer including the holes is the side that receives sound.

In the sound-absorbing material of the present invention, the inorganic material layer mainly containing a calcium-based material is formed on the surface of the fiber layer.

As described above, when the sound-absorbing material receives sound, sound is incident to the holes open to the surface of the fiber layer. The sound is reflected and attenuated in the holes and absorbed in the fiber layer, whereby sound absorption is achieved. When the sound is reflected in the holes, part of the sound tends to exit to the outside by passing through the fiber layer.

When the inorganic material layer is formed on the surface of the fiber layer, the sound that tends to exit to the outside by passing through the fiber layer can be reflected and the sound leakage to the outside thus can be prevented.

As a result, the sound can be efficiently absorbed.

The sound-absorbing material of the present invention is used in or around an engine, engine room, vehicle body, exhaust pipe, or the like. The sound-absorbing material of the present invention, when used in such an environment, is exposed to high temperatures of 400° C. or higher.

In the case of a sound-absorbing material without an inorganic material layer, exposure of the sound-absorbing material to high temperatures of 400° C. or higher may cause stretching or shrinking of the fiber layer, and may change the shape and size of the holes open to the surface of the fiber layer. Such deformation changes the frequency range of the sound to be absorbed. As a result, the sound absorption coefficient in the frequency range of 800 to 5000 Hz may be insufficient.

The sound-absorbing material of the present invention includes an inorganic material layer. Owing to the inorganic material layer formed in the sound-absorbing material, the shape and size of the holes formed in the surface of the fiber layer tend to be maintained even when the sound-absorbing material is exposed to high temperatures of 400° C. or higher. Thus, the sound absorption performance is easily maintained.

In the sound-absorbing material of the present invention, the inorganic material layer has a thickness of 0.4 to 0.6 mm.

An inorganic material layer having a thickness of less than 0.4 mm does not much contribute to the sound absorption effect.

An inorganic material layer having a thickness of more than 0.6 mm easily reflects high-frequency sound, and the sound is less likely to be absorbed.

In addition, such an inorganic material layer may not have flexibility and be cracked when the sound-absorbing material is placed at a predetermined position, failing to maintain the opening shape.

In the sound-absorbing material of the present invention, the holes in the fiber layer have a depth corresponding to 50 to 90% of the thickness of the fiber layer.

When the holes have a depth corresponding to less than 50% of the thickness of the fiber layer, the depth of the holes tends to be insufficient to reflect and absorb the sound. Thus, the sound is less likely to be absorbed, making it difficult to achieve sound absorption performance.

When the holes have a depth corresponding to more than 90% of the thickness of the fiber layer, the sound that entered the holes of the sound-absorbing material is not absorbed in the fiber layer and passes therethrough, making it difficult to achieve sound absorption performance.

In the sound-absorbing material of the present invention, more preferably, the fiber layer has a thickness of 3 to 50 mm. A fiber layer having a thickness of more than 50 mm has no problems in functional performance and sound absorption performance as a sound-absorbing material, however, the thickness may interfere with placement of such a sound-absorbing material for automotive use in or around an engine, engine room, vehicle body, or exhaust pipe.

In the sound-absorbing material of the present invention, preferably, the fiber layer includes a stack of two or more fiber layers.

Use of two or more fiber layers facilitates adjusting the thickness of the sound-absorbing material.

In the sound-absorbing material of the present invention, the fiber layer may be a fiber layer including a stack of two fiber layers. In this case, through-holes are formed in a first fiber layer but not in a second fiber layer, assuming that the first fiber layer is closer to the side that receives sound than the second fiber layer is, and these two fiber layers are then stacked together, whereby blind holes each having a bottom inside the fiber layer can be produced.

Forming through-holes in the first fiber layer and stacking the first fiber layer and the second fiber layer without holes to form blind holes each having a bottom inside the fiber layer is easier than forming blind holes having bottoms inside the fiber layer using only one fiber layer.

In the sound-absorbing material of the present invention, preferably, the fiber layer contains inorganic fibers.

Inorganic fibers have high heat resistance and are less likely to be deformed by temperature changes. Thus, the fiber layer containing inorganic fibers can absorb sound also in the spaces formed by the fibers, easily achieving sound absorption performance.

In the sound-absorbing material of the present invention, preferably, the inorganic fibers consist of at least one type of inorganic fibers selected from the group consisting of alumina fibers, alumina-silica fibers, silica fibers, glass wool, and rock wool.

These inorganic fibers have high heat resistance and are less likely to be deformed by temperature changes, unlike a non-woven fabric formed of organic fibers. Thus, the inorganic fibers are suitably used to form the fiber layer.

In the sound-absorbing material of the present invention, preferably, the area of an open end of each hole is 0.20 to 15 $mm^2$.

When the area of the open end of each hole is less than 0.20 $mm^2$, sound does not easily enter the holes and is less likely to be reflected or attenuated in the holes, making it difficult to achieve sound absorption performance.

When the area of the open end of each hole is more than 15 $mm^2$, it is difficult to design the size of the open end to allow absorption of the target sound having a specific frequency. Thus, the sound having a specific frequency which should be absorbed is less likely to be reflected or absorbed in the holes, making it difficult to achieve sound absorption performance.

When the area of the open end of each hole is in the range of 0.20 to 15 $mm^2$, the sound is easily reflected and absorbed in the holes, making it easy to achieve sound absorption performance.

Preferably, the sound-absorbing material of the present invention has an average sound absorption coefficient of 0.70 or more in the frequency range of 800 to 5000 Hz.

The sound in the frequency range of 800 to 2000 Hz is unpleasant to the human ear. The sound in the frequency range of 2000 to 5000 Hz is also disturbing to the human ear.

When the average sound absorption coefficient in the frequency range of 800 to 5000 Hz is 0.70 or more, it is possible to reduce unpleasantness for people. Thus, such a sound-absorbing material is considered to have excellent sound absorption performance.

In the present invention, the term "sound absorption coefficient" means the sound absorption coefficient measured in accordance with JIS A 1405-2:2007 "Acoustics—Determination of sound absorption coefficient and impedance in impedance tubes—Part 2: Transfer-function method".

The sound-absorbing material of the present invention is preferably used in or around any of an engine, an engine room, a vehicle body, or an exhaust pipe.

Use of the sound-absorbing material of the present invention in these parts enables efficient absorption of a sound having a frequency of 800 to 5000 Hz.

DESCRIPTION OF EMBODIMENTS

Figure 1A:
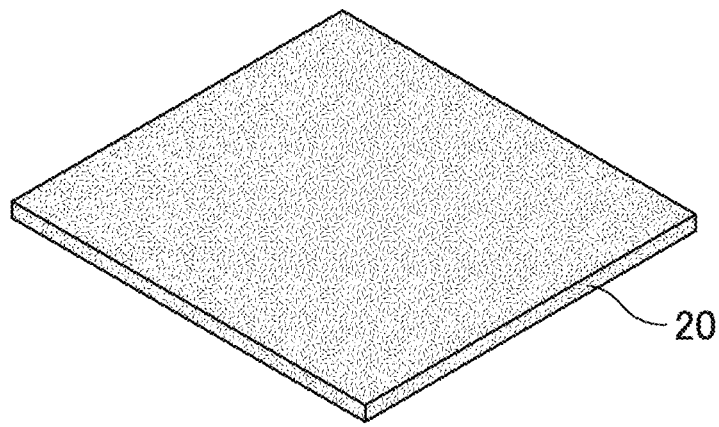
FIG. 1A is a schematic view showing a step of an exemplary method of producing the sound-absorbing material of the present invention.

The sound-absorbing material of the present invention is described in detail below.

The present invention provides a sound-absorbing material including: a fiber layer including a plurality of holes open to a surface thereof and having a thickness of 3 mm or more; and an inorganic material layer mainly containing a calcium-based material and having a thickness of 0.4 to 0.6 mm on the surface of the fiber layer, the holes being blind holes each penetrating through the inorganic material layer and having a bottom inside the fiber layer, each hole having a depth corresponding to 50 to 90% of the thickness of the fiber layer.

The sound-absorbing material of the present invention includes a plurality of holes open to the surface of the fiber layer, and the holes are blind holes each penetrating through the inorganic material layer and having a bottom inside the fiber layer.

When the sound-absorbing material receives sound, sound is incident to the holes open to the surface of the fiber layer. The sound is reflected and attenuated in the holes and absorbed in the fiber layer, whereby sound absorption is achieved.

In the present invention, the surface of the inorganic fiber layer including the holes is the side that receives sound.

In the sound-absorbing material of the present invention, the holes are blind holes.

If the sound-absorbing material included through-holes penetrating through the fiber layer, the sound received by the sound-absorbing material would pass through the through-holes. Thus, the sound would be transferred to the back side of the fiber layer of the sound-absorbing material, and the sound-absorbing material would fail to function as a sound-absorbing material.

In contrast, in the sound-absorbing material of the present invention, the holes have bottoms inside the fiber layer. Thus, the sound that entered the holes will be reflected and attenuated. As the sound enters the fiber layer, the sound is absorbed in the fibers. As a result, the sound is less likely to be transferred to the back side of the sound-absorbing material, achieving sound absorption performance.

In the sound-absorbing material of the present invention, the fiber layer has a thickness of 3 mm or more, preferably 3 to 50 mm.

A fiber layer having a thickness of less than 3 mm is too thin to absorb sound, making it difficult to achieve sufficient sound absorption performance.

A fiber layer having a thickness of more than 50 mm has no problems in functional performance and sound absorption performance as a sound-absorbing material, however, the thickness may interfere with placement of such a sound-absorbing material for automotive use in or around an engine, engine room, vehicle body, or exhaust pipe.

In the sound-absorbing material of the present invention, the fiber layer may include a stack of two or more fiber layers.

Use of two or more fiber layers facilitates adjusting the thickness of the sound-absorbing material. The two or more fiber layers may be adhered to each other by an adhesive such as an inorganic adhesive or an organic adhesive.

The type of the material constituting each of the two or more fiber layers may be the same as or different from each other.

The thickness of each of the two or more fiber layers may be the same as or different from each other. The bulk density of each of the two or more fiber layers may be the same as or different from each other.

In the sound-absorbing material of the present invention, the number of fiber layers is not limited, but two layers are preferred. In this case, through-holes are formed in a first fiber layer but not in a second fiber layer, assuming that the first fiber layer is closer to the side that receives sound than the second fiber layer is, and these two fiber layers are then stacked together, whereby blind holes each having a bottom inside the fiber layer can be produced.

Forming through-holes in the first fiber layer and stacking the first fiber layer and the second fiber layer without holes to form blind holes each having a bottom inside the fiber layer is easier than forming blind holes having bottoms inside the fiber layer using only one fiber layer.

In the sound-absorbing material of the present invention, preferably, the fiber layer contains inorganic fibers.

Inorganic fibers have high heat resistance and are less likely to be deformed by temperature changes. Thus, the fiber layer containing inorganic fibers can absorb sound also in the spaces formed by the fibers, easily achieving sound absorption performance.

In the sound-absorbing material of the present invention, preferably, the inorganic fibers consist of at least one type of inorganic fibers selected from the group consisting of alumina fibers, alumina-silica fibers, silica fibers, glass wool, and rock wool.

These inorganic fibers have high heat resistance and are less likely to be deformed, unlike a non-woven fabric formed of organic fibers. Thus, the inorganic fibers are suitably used to form the fiber layer.

The inorganic fibers for use in the sound-absorbing material of the present invention are more preferably alumina-silica fibers.

When the inorganic fibers are alumina-silica fibers, the ratio of alumina to silica by weight is preferably 60:40 to 80:20 (alumina ($Al_2O_3$):silica ($SiO_2$)), more preferably 70:30 to 74:26 (alumina ($Al_2O_3$):silica ($SiO_2$)).

The average fiber length of the fibers forming the fiber layer is preferably 0.1 to 150 mm, more preferably 1 to 20 mm, still more preferably 2 to 15 mm.

Fibers having an average fiber length of less than 0.1 mm are too short, resulting in insufficient entangling of the fibers with each other in the fiber layer. Such a fiber layer has low strength and poor shape retainability, and cannot function as a sound-absorbing material.

Fibers having an average fiber length of more than 150 mm are too long, making it difficult to produce a fiber layer. Further, the resulting fiber layer has a low density and poor shear strength, so that the fiber layer, when used as a sound-absorbing material, is susceptible to defects such as cracks, and cannot function as a sound-absorbing material.

The fiber layer constituting the sound-absorbing material can be produced by various methods. For example, a needling method or papermaking method can be used.

The fiber layer obtained by the needling method has an entangled structure. In order to obtain this structure, the fibers need to have a certain average fiber length. Thus, the average fiber length of the fibers to be used in the needling method is preferably 1 to 150 mm, more preferably 10 to 80 mm.

Inorganic fibers having an average fiber length of less than 1 mm are too short, resulting in insufficient entangling of the fibers with each other. The resulting fiber layer has low strength and poor shape retainability, and cannot function as a sound-absorbing material. Further, when such a sound-absorbing material is wound around an exhaust gas treating body, it is poorly wound and is thus easily breakable.

Fibers having an average fiber length of more than 150 mm are too long, resulting in a reduced number of fibers constituting the sound-absorbing material. The resulting fiber layer has a low density, so that the fiber layer, when used as a sound-absorbing material, is susceptible to defects such as cracks.

Preferably, the average fiber length of the fibers constituting the fiber layer obtained by the papermaking method is 0.1 to 20 mm.

Fibers having an average fiber length of less than 0.1 mm are too short, so that the resulting fiber layer has poor shape retainability. Further, such fibers will not be suitably entangled with each other when assembled into a fiber layer, making it difficult to achieve a sufficient contact pressure.

Fibers having an average fiber length of more than 20 mm are too long and thus too strongly entangled with each other in a slurry solution obtained by dispersing the fibers in water in a papermaking step. Such fibers tend to unevenly accumulate when assembled into a fiber layer, and the fiber layer has poor shear strength. Thus, the fiber layer, when used as a sound-absorbing material, is susceptible to defects such as cracks.

For fiber length measurement, fibers are pulled out without breaking the fibers using tweezers from the fiber layer produced by the needling method or papermaking method, and the fiber length is measured using an optical microscope.

As used herein, the average fiber length is the average length determined by measuring the fiber length of 300 fibers pulled out from the fiber layer. When the fibers cannot be pulled out from the fiber layer without breaking the fibers, the fiber layer may be degreased and introduced into water, so that fibers can be picked up without breaking the fibers while separating the fibers from each other.

The average fiber diameter of the fibers forming the fiber layer is preferably 1 to 20 μm, more preferably 2 to 15 μm, still more preferably 3 to 10 μm.

Fibers having an average fiber diameter of less than 1 μm have low strength and are easily broken due to impact or the like. Thus, the resulting fiber layer has low strength and cannot function as a sound-absorbing material.

Fibers having an average fiber diameter of more than 20 μm are too large, resulting in a high Young's modulus of the fibers. The resulting fiber layer tends to have a low flexibility. Thus, the fiber layer cannot function as a sound-absorbing material.

The fiber layer of the present invention may contain fibers such as glass fibers and biosoluble fibers, in addition to the inorganic fibers.

In the sound-absorbing material of the present invention, the holes in the fiber layer have a depth corresponding to 50 to 90%, more preferably 50 to 75%, of the thickness of the fiber layer.

When the holes have a depth corresponding to less than 50% of the thickness of the fiber layer, the depth of the holes tends to be insufficient to reflect and absorb the sound. Thus, the sound is less likely to be absorbed, making it difficult to achieve sound absorption performance.

When the holes have a depth corresponding to more than 90% of the thickness of the fiber layer, the sound that entered the holes of the sound-absorbing material is not absorbed in the fiber layer and passes therethrough, making it difficult to achieve sound absorption performance.

In contrast, when the depth of the holes is in the range of 50 to 90%, the depth of the holes is sufficient to reflect the sound incident in the holes, making it possible to absorb the sound. Thus, the sound-absorbing material has sound absorption performance. Because of these reasons, the sound-absorbing material of the present invention can achieve sound absorption performance.

The following describes the open end of each hole open to the surface of the fiber layer of the sound-absorbing material of the present invention.

Regarding the open end of each hole in the sound-absorbing material of the present invention, it is important that the area of the open end is not affected by external force. The shape is not limited, and it may be circular, elliptical, triangular, quadrangular, hexagonal, octagonal, or the like. In particular, the shape of the open end is preferably circular or elliptical because these shapes do not have corners, which prevents stress concentration at the corners.

In the sound-absorbing material of the present invention, the shape of the open end of each hole may be the same as or different from each other.

In the sound-absorbing material of the present invention, the open ends of the holes may be arranged in a square pattern in which the open ends are arranged at corners of squares on a plane where the squares are continuously arranged in longitudinal and transverse directions. Alternatively, the open ends may be arranged in a zigzag pattern in which the open ends are arranged at corners of equilateral triangles on a plane where the equilateral triangles are continuously arranged in longitudinal and transverse directions. Of these, the zigzag pattern is preferred. When the open ends of the holes are arranged in the zigzag pattern, all the adjacent holes tend to have the same interval, and the sound attenuation efficiency tends to be high.

In the sound-absorbing material of the present invention, the area of the open end of each hole is preferably 0.20 to 15 mm$^2$, more preferably 2.0 to 15 mm$^2$.

When the area of the open end of each hole is less than 0.20 mm$^2$, sound does not easily enter the holes and is less likely to be reflected or attenuated in the holes, making it difficult to achieve sound absorption performance.

When the area of the open end of each hole is more than 15 mm², it is difficult to design the size of the open end to allow absorption of the target sound having a specific frequency. Thus, the sound having a specific frequency which should be absorbed is less likely to be reflected or absorbed in the holes, making it difficult to achieve sound absorption performance. It also makes it difficult to achieve sound absorption performance in the frequency range of not more than 2000 Hz.

In contrast, when the area of the open end of each hole is in the range of 0.20 to 15 mm², the sound is easily reflected and absorbed in the holes, making it easy to achieve sound absorption performance. It also makes it easy to achieve sound absorption performance in the frequency range of not more than 2000 Hz.

In the sound-absorbing material of the present invention, when the open end of each hole has a circular shape, the diameter of the open end of each hole is preferably 0.50 to 4.0 mm, more preferably 1.0 to 3.0 mm.

In the sound-absorbing material of the present invention, an inorganic material layer mainly containing a calcium-based material is formed on the surface of the fiber layer.

When the inorganic material layer is formed on the surface of the fiber layer, the following effect can be achieved in relation to the holes open to the surface of the fiber layer.

As described above, when the sound-absorbing material receives sound, sound is incident to the holes open to the surface of the fiber layer. The sound is reflected and attenuated in the holes and absorbed in the fiber layer, whereby sound absorption is achieved. When the sound is reflected in the holes, part of the sound tends to exit to the outside by passing through the fiber layer.

When the inorganic material layer is formed on the surface of the fiber layer, the sound that tends to exit to the outside by passing through the fiber layer can be reflected and the sound leakage to the outside thus can be prevented.

As a result, the sound can be efficiently absorbed.

The sound-absorbing material of the present invention is used in or around an engine, engine room, vehicle body, an exhaust pipe, or the like. The sound-absorbing material of the present invention, when used in such an environment, is exposed to high temperatures of 400° C. or higher.

In the case of a sound-absorbing material without an inorganic material layer, exposure of the sound-absorbing material to high temperatures of 400° C. or higher may cause stretching or shrinking of the fiber layer, and may change the shape and size of the holes open to the surface of the fiber layer. Such deformation changes the frequency range of the sound to be absorbed. As a result, the sound absorption coefficient in the frequency range of 800 to 5000 Hz may be insufficient.

The sound-absorbing material of the present invention includes an inorganic material layer. Owing to the inorganic material layer formed in the sound-absorbing material, the shape and size of the holes formed in the surface of the fiber layer tend to be maintained even when the sound-absorbing material is exposed to high temperatures of 400° C. or higher. Thus, the sound absorption performance is easily maintained.

In the sound-absorbing material of the present invention, the inorganic material layer has a thickness of 0.4 to 0.6 mm.

An inorganic material layer having a thickness of less than 0.4 mm does not much contribute to the reflection effect in the holes.

An inorganic material layer having a thickness of more than 0.6 mm may not have flexibility and be cracked when the sound-absorbing material is placed at a predetermined position, failing to maintain the opening shape.

In the sound-absorbing material of the present invention, preferably, the inorganic material layer has a density of 2 to 6 (g/cm³).

The density of the inorganic material layer is preferably three or more times the density of the fiber layer, and it is more preferably 3 to 30 times the density of the fiber layer.

Preferably, the sound-absorbing material of the present invention has an average sound absorption coefficient of 0.70 or more in the frequency range of 800 to 5000 Hz.

The sound in the frequency range of 800 to 2000 Hz is unpleasant to the human ear. The sound in the frequency range of 2000 to 5000 Hz is also disturbing to the human ear.

When the average sound absorption coefficient in the frequency range of 800 to 5000 Hz is 0.70 or more, it is possible to reduce unpleasantness for people. Thus, such a sound-absorbing material is considered to have sufficient sound absorption performance.

The sound-absorbing material of the present invention may have any shape as long as it has a shape that fits in a place where the sound-absorbing material is disposed.

Use of the sound-absorbing material of the present invention is not limited. Yet, preferably, the sound-absorbing material is for automotive use. Specifically, the sound-absorbing material is preferably used in or around any of an engine, an engine room, a vehicle body, or an exhaust pipe.

Use of the sound-absorbing material of the present invention in these parts enables efficient absorption of a sound having a frequency of 800 to 5000 Hz.

The sound-absorbing material may be disposed on a curved surface when used in or around any of an engine room, a vehicle body, or an exhaust pipe. In such a case, the sound-absorbing material needs to be curved. In this case, stress is generated in the sound-absorbing material, and the inorganic material layer is susceptible to breaking and cracking. Thus, a sound-absorbing material having a shape that fits the shape of the curve may be provided in advance, and disposed on the curved surface. Alternatively, many small sound-absorbing materials may be prepared and disposed on the curved surface to alleviate the stress generated in each sound-absorbing material so as to prevent breaking and cracking in the inorganic material layer.

Next, an exemplary method of producing the sound-absorbing material of the present invention is described.

The method of producing the sound-absorbing material of the present invention described below includes (1) a fiber layer producing step, (2) a hole forming step, and (3) an inorganic material layer forming step.

Figure 1B:
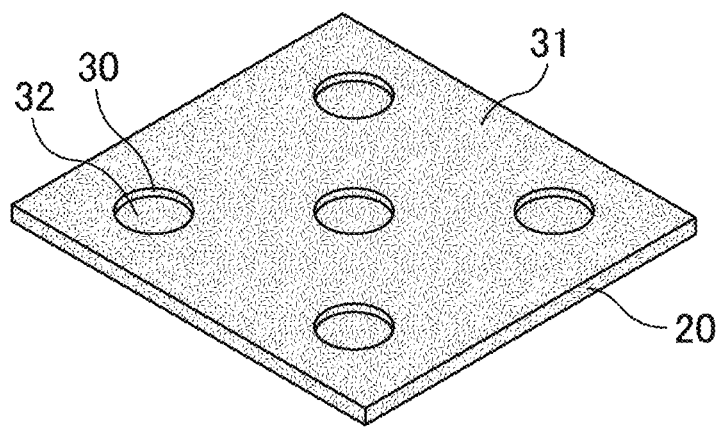
FIG. 1B is a schematic view showing a step of an exemplary method of producing the sound-absorbing material of the present invention.
Figure 1C:
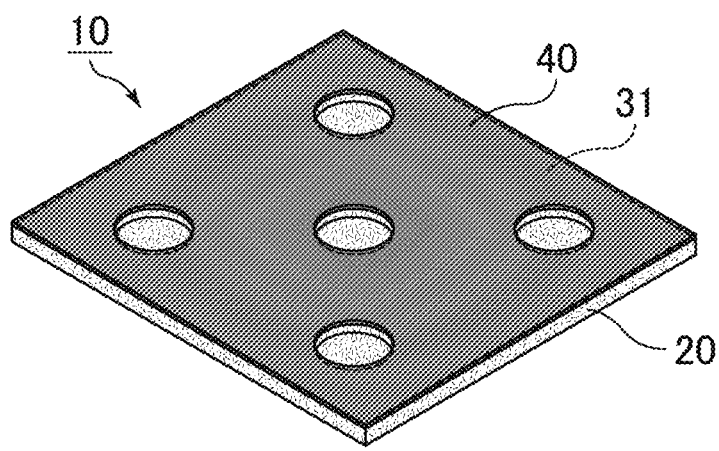
FIG. 1C is a schematic view showing a step of an exemplary method of producing the sound-absorbing material of the present invention.

FIG. 1A, FIG. 1B, and FIG. 1C are schematic views each showing a step of an exemplary method of producing the sound-absorbing material of the present invention.

(1) Fiber Layer Producing Step

As shown in FIG. 1A, in this step, a fiber layer 20 having a thickness of 3 mm or more is prepared. The fiber layer 20 may be prepared by any method. The following describes a method of preparing the fiber layer 20 by a papermaking method as an example. The papermaking method described below includes a mixture preparing step, a dehydrating step, and a thermally compressing step.

(Mixture Preparing Step)

Fibers, an inorganic binder, and water are mixed and stirred with a stirrer, whereby a mixture is prepared. Here, inorganic particles and an organic binder may also be mixed, if necessary. Details such as preferred type of the fibers to be used in this step have been already described, so that a description thereof is omitted here.

(Dehydrating Step)

The mixture obtained in the mixture preparing step is poured into a mold including a filtration mesh on its bottom. Then, the water in the mixture is removed through the mesh, whereby a raw material sheet is produced.

(Thermally Compressing Step)

The raw material sheet is thermally compressed, whereby a fiber layer is produced. When thermally compressing, the raw material sheet may be heat-treated for drying by allowing hot air to pass therethrough, or the raw material sheet may not be heat-treated and may be in a wet state.

The fiber layer can be prepared by the above steps.

(2) Hole Forming Step

As shown in FIG. 1B, in this step, holes 30 are formed in the fiber layer 20 produced in the fiber layer producing step (1) such that each hole 30 has a bottom 32 inside the fiber layer 20. Thereby, each hole 30 becomes a blind hole having the bottom 32 inside the fiber layer 20.

The holes 30 are formed such that each hole 30 has a depth corresponding to 50 to 90% of the thickness of the fiber layer 20.

The method of forming the holes 30 is not limited. Examples include a method in which a portion of the fiber layer 20 is cut out using, for example, a cutter, laser, or drill, without penetrating through the fiber layer 20.

(3) Inorganic Material Layer Forming Step

As shown in FIG. 1C, in this step, in the fiber layer 20 in which the holes 30 are formed in the hole forming step (2), an inorganic material layer 40 is formed on a surface 31 of the fiber layer. The method of forming the inorganic material layer 40 is not limited. Examples include coating and printing.

The following describes a method of forming the inorganic material layer 40 on the fiber layer 20 by coating.

(Inorganic Material Adding Step)

In this step, first, a powdered inorganic material mainly containing a calcium-based material is applied to the surface 31 of the fiber layer where no holes 30 are formed.

Then, water is added to the inorganic material to slurry the inorganic material applied to the surface 31 of the fiber layer where no holes 30 are formed.

As described above, the powdered inorganic material is applied to the surface 31 of the fiber layer where no holes 30 are formed, and the inorganic material is then slurried as described above, whereby the inorganic material layer 40 to be formed is firmly fixed to the fiber layer 20.

The amount of the inorganic material to be added is adjusted such that the inorganic material layer resulting from the later-described drying step has a thickness of 0.4 to 0.6 mm.

(Drying Step)

In this step, the slurry inorganic material applied to the surface 31 of the fiber layer where no holes 30 are formed is dried, whereby the inorganic material layer 40 is obtained.

The drying conditions are not limited, but preferably, the slurry inorganic material is dried at 70° C. to 100° C. for 5 to 15 minutes.

A sound-absorbing material 10 can be produced by the above steps.

In the inorganic material layer forming step, first, a powdered inorganic material is applied to the surface 31 of the fiber layer, and water is then added to the inorganic material to slurry the inorganic material. Yet, in the method of producing the sound-absorbing material of the present invention, the slurry inorganic material may be directly applied to the surface 31 of the fiber layer where no holes 30 are formed.

Next, another exemplary method of producing the sound-absorbing material of the present invention is described. Specifically, it is a method of producing the sound-absorbing material by stacking two fiber layers.

The method of producing the sound-absorbing material of the present invention described below includes (1) a fiber layer producing step, (2) a hole forming step, (3) an inorganic material layer forming step, and (4) a fiber layer producing step.

FIG. 2A, FIG. 2B, FIG. 2C, FIG. 2D, and FIG. 2E are schematic views each showing a step of an exemplary method of producing the sound-absorbing material of the present invention.

(1) Fiber Layer Producing Step

Figure 2A:
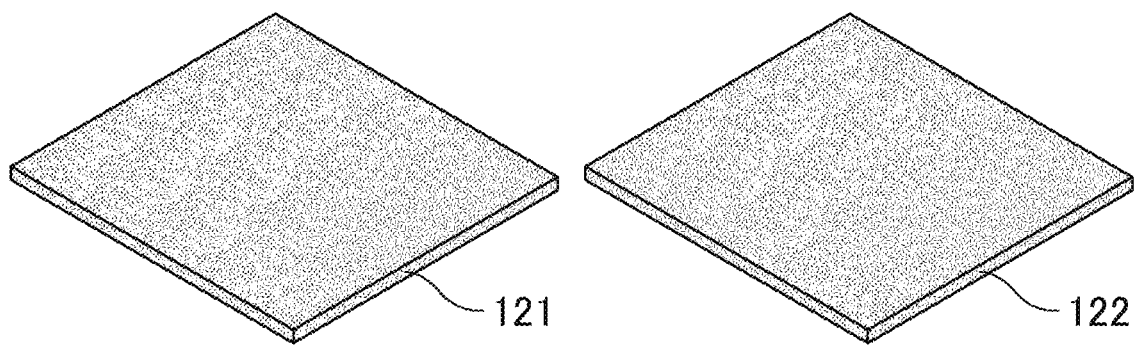
FIG. 2A is a schematic view showing a step of an exemplary method of producing the sound-absorbing material of the present invention.

As shown in FIG. 2A, in this step, a first fiber layer 121 and a second fiber layer 122 are prepared. The method of preparing each of these fiber layers is not limited. Yet, for example, these fiber layers can be produced by the same method as that of producing the fiber layer in the fiber layer producing step (1) of the method of producing the sound-absorbing material 10.

(2) Hole Forming Step

Figure 2B:
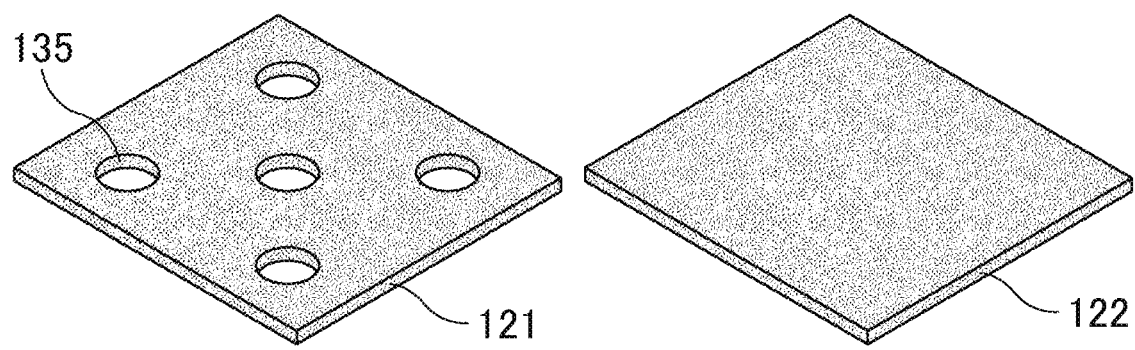
FIG. 2B is a schematic view showing a step of an exemplary method of producing the sound-absorbing material of the present invention.

As shown in FIG. 2B, in this step, through-holes 135 are formed to penetrate through the first fiber layer 121.

The method of forming the through-holes 135 in the first fiber layer 121 is not limited. For example, the first fiber layer 121 may be cut out using a cutter to make the through-holes 135, or the first fiber layer 121 may be punched out using a punching machine, laser, or drill to form the through-holes 135. Of these, the method that uses a punching machine is preferred. The method that uses a punching machine is economical because the through-holes 135 can be easily, quickly, and continuously formed.

(3) Inorganic Material Layer Forming Step

Figure 2C:
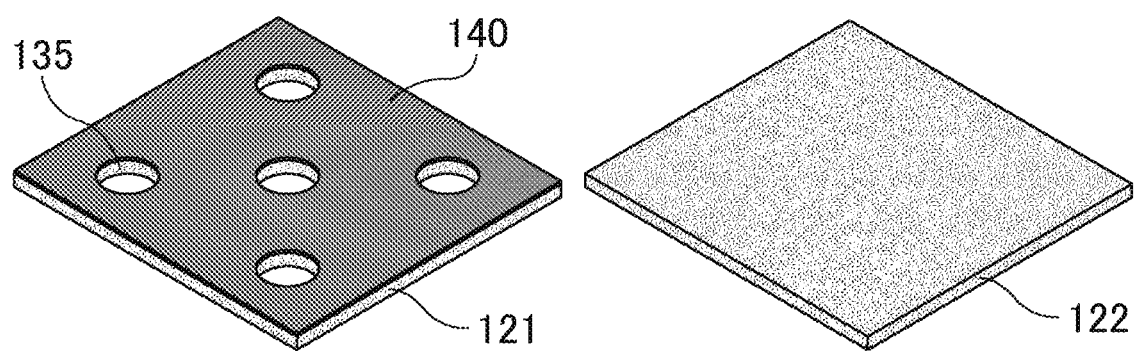
FIG. 2C is a schematic view showing a step of an exemplary method of producing the sound-absorbing material of the present invention.

As shown in FIG. 2C, in this step, an inorganic material layer 140 is formed on one of the main surfaces of the first fiber layer 121 in which the through-holes 135 are formed in the hole forming step (2).

The method of forming the inorganic material layer 140 is not limited. Yet, the inorganic material layer 140 can be produced by the same method as that of producing the inorganic material layer 40 in the inorganic material layer forming step (3) of the method of producing the sound-absorbing material 10.

(4) Fiber Layer Producing Step

Figure 2D:
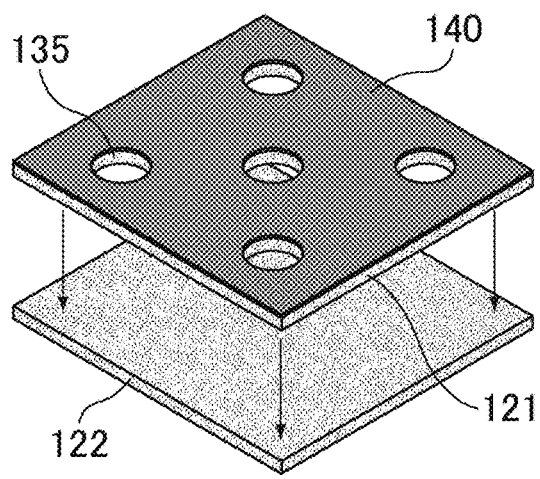
FIG. 2D is a schematic view showing a step of an exemplary method of producing the sound-absorbing material of the present invention.

As shown in FIG. 2D, in this step, the first fiber layer 121 on which the inorganic material layer is formed and the second fiber layer 122 are stacked together, whereby a fiber layer 120 is produced.

Figure 2E:
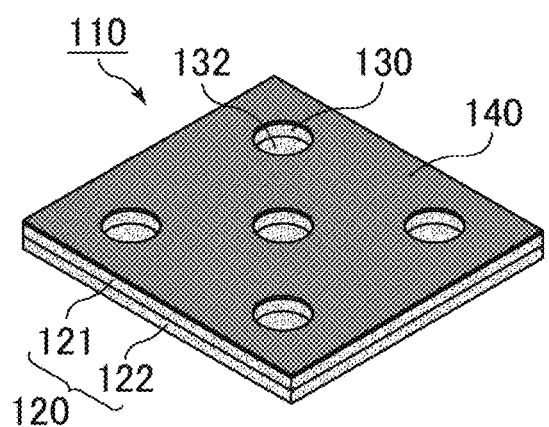
FIG. 2E is a schematic view showing a step of an exemplary method of producing the sound-absorbing material of the present invention.

When stacking the first fiber layer 121 and the second fiber layer 122, the back side of the first fiber layer 121 where no inorganic material layer 140 is formed is bonded to a surface of the second fiber layer using an adhesive, whereby the fiber layer 120 as shown in FIG. 2E is obtained.

The adhesive may be an inorganic binder, organic binder, or the like.

Caution is needed to prevent the adhesive from being attached to positions of the surface of the second fiber layer 122 on the side that comes into contact with the first fiber layer 121, the positions corresponding to the through-holes 135 formed in the first fiber layer 121. It is because the adhesive, when attached to positions corresponding to the through-holes 135 formed in the first fiber layer 121, may interfere with sound absorption.

The through-holes 135 formed in the first fiber layer 121 become holes 130 having the bottoms 132 inside the fiber layer 120 consisting of a stack of layers.

A sound-absorbing material 110 as shown in FIG. 2E can be produced by the above steps.

The sound-absorbing material 110 may also be produced by stacking the first fiber layer 121 in which the through-holes 135 are formed and the second fiber layer 122, and then forming the inorganic fiber layer 140.

The following describes a pattern of arrangement for hole formation in the method of producing the sound-absorbing material of the present invention.

Figure 3A:
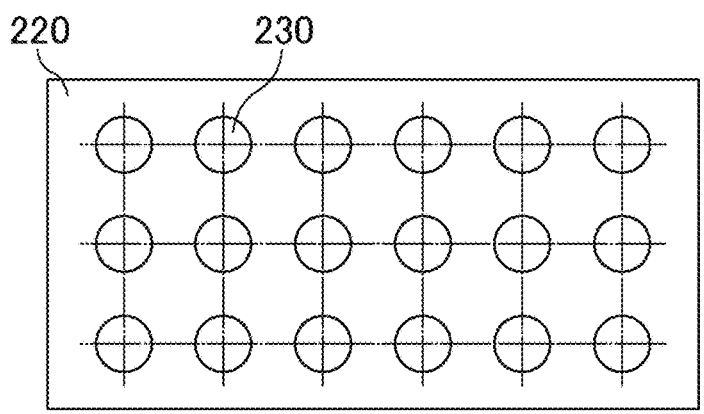
FIG. 3A is a schematic view showing a pattern of arrangement for hole formation in the method of producing the sound-absorbing material of the present invention.
Figure 3B:
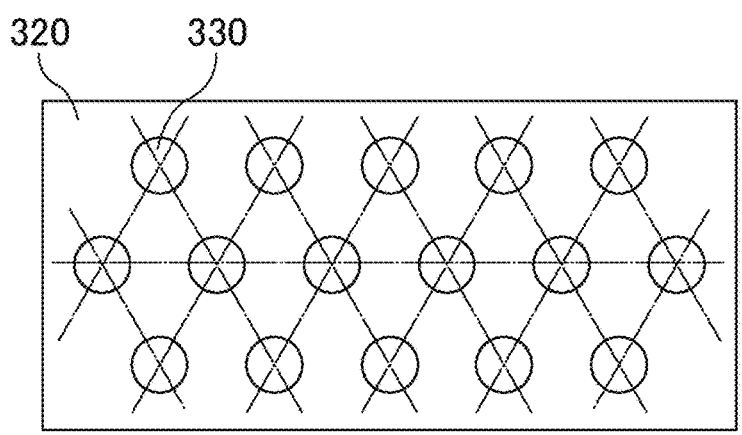
FIG. 3B is a schematic view showing a pattern of arrangement for hole formation in the method of producing the sound-absorbing material of the present invention.

FIG. 3A and FIG. 3B are schematic views each showing a pattern of arrangement for hole formation in the method of producing the sound-absorbing material of the present invention.

As shown in FIG. 3A, holes 230 may be formed in a fiber layer 220 such that the holes 230 are positioned at corners of squares on a plane where the squares are continuously arranged in longitudinal and transverse directions.

Alternatively, as shown in FIG. 3B, holes 330 may be formed in a fiber layer 320 such that the holes 330 are positioned at corners of equilateral triangles on a plane where the equilateral triangles are continuously arranged in longitudinal and transverse directions.

The following describes the shape of a cross section of the sound-absorbing material of the present invention, parallel to a depth direction of the holes, with reference to the drawing.

Figure 4:
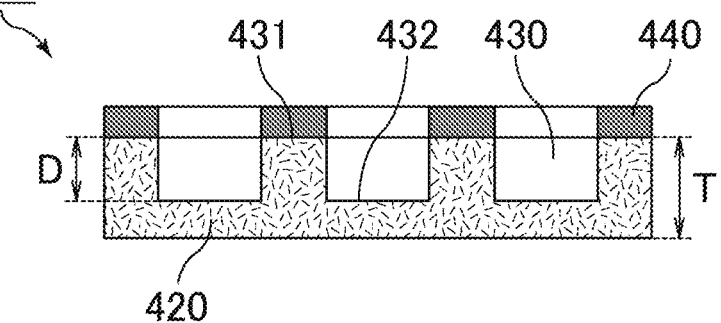
FIG. 4 is a schematic cross-sectional view showing an exemplary shape of a cross section of the sound-absorbing material of the present invention, parallel to a depth direction of holes.

FIG. 4 is a schematic cross-sectional view showing an exemplary shape of a cross section of the sound-absorbing material of the present invention, parallel to the depth direction of the holes.

As shown in FIG. 4, a sound-absorbing material 410 is a sound-absorbing material including a fiber layer 420 including a plurality of holes 430 open to a surface thereof, the fiber layer 420 having a thickness T of 3 mm or more, the sound-absorbing material 410 including an inorganic material layer 440 mainly containing a calcium-based material on a surface 431 of the fiber layer 420. The inorganic material layer has a thickness of 0.4 to 0.6 mm.

In the sound-absorbing material 410, the holes 430 are blind holes each penetrating through the inorganic material layer 440 and having a bottom 432 inside the fiber layer 420. The holes 430 in the fiber layer 420 have a depth D corresponding to 50 to 90% of the thickness T of the fiber layer 420.

EXAMPLES

Examples that more specifically disclose the present invention are described below, but the present invention is not limited to these examples.

Example 1

(1) Fiber Layer Producing Step
(Production of Inorganic Fiber Layer)

An inorganic fiber layer was produced by the needling method.

An aqueous solution of basic aluminum chloride having an Al content of 70 g/L was prepared such that the ratio of Al:Cl was 1:1.8 (atomic ratio). A silica sol was added to the solution such that the ratio of alumina ($Al_2O_3$) to silica ($SiO_2$) was 72:28 (weight ratio) in inorganic fibers after firing, followed by addition of an appropriate amount of an organic polymer (polyvinyl alcohol), whereby a mixture was prepared.

The resulting mixture was concentrated into a spinning mixture, and the spinning mixture was spun by blowing, whereby an inorganic fiber precursor was prepared.

A plurality of spun inorganic fiber precursors were stacked together, followed by needling, whereby two sheets were produced.

The sheets were continuously fired at a maximum temperature of 1250° C. Thus, two fiber sheets each having a length of 600 mm, a width of 200 mm, and a thickness of 5 mm and containing inorganic fibers including alumina and silica at a ratio of 72:28 (by weight) were produced.

The resulting fiber layers each had a bulk density of 0.15 $g/cm^3$ and a basis weight of 1050 $g/m^2$.

(2) Hole Forming Step

Next, a punching machine was used on one of the fiber layers to form through-holes that penetrate through the fiber layer. These through-holes were formed such that each hole had a circular open end having a diameter of 3 mm and these open ends were arranged in a zigzag pattern at intervals of 12 mm.

The fiber layer with through-holes was regarded as a first fiber layer, and the fiber layer without holes was regarded as a second fiber layer.

(3) Inorganic Material Layer Forming Step
(3-1) Inorganic Material Preparing Step A powdered inorganic material mainly containing calcium oxide was prepared.

(3-2) Inorganic Material Adding Step

Next, the inorganic material was applied to a non-opening portion of the first fiber layer.

Then, water was added to the inorganic material to slurry the inorganic material applied to the first fiber layer.

(3-3) Drying Step

Next, the slurry inorganic material applied to the first fiber layer was dried at 70° C. for 10 minutes to form an inorganic material layer.

The inorganic material layer had a thickness of 0.4 mm.

(4) Fiber Layer Producing Step

The back side of the first fiber layer without an inorganic material layer was bonded by an adhesive to a surface of the second fiber layer, whereby a fiber layer was obtained.

Thus, the through-holes formed in the first fiber layer became blind holes each having a bottom inside the fiber layer.

A sound-absorbing material according to Example 1 was produced by the above steps.

Example 2

A sound-absorbing material according to Example 2 was produced as in Example 1, except that the inorganic material layer was made to have a thickness of 0.6 mm in "(3) Inorganic material layer forming step" described above.

Comparative Example 1

A sound-absorbing material according to Comparative Example 1 was produced as in Example 1, except that the inorganic material layer was made to have a thickness of 1.0 mm in "(3) Inorganic material layer forming step" described above.

Comparative Example 2

A sound-absorbing material according to Comparative Example 2 was produced as in Example 1, except that "(2)

Hole forming step" was not performed and that the inorganic material layer was made to have a thickness of 1.0 mm.
(Measurement of Sound Absorption Coefficient)

The sound absorption coefficient was determined by a normal-incidence sound-absorption-coefficient test. Measurement was performed in accordance with JIS A 1405-2: 2007 "Acoustics—Determination of sound absorption coefficient and impedance in impedance tubes—Part 2: Transfer-function method".

For the measurement of the sound absorption coefficient, the sound-absorbing materials according to the examples and the comparative examples were cut into circles each having a diameter of 29 mm, and each piece was placed in an impedance tube of a measurement device (Nittobo Acoustic Engineering Co., Ltd., model: WinZac MTX) for measuring the normal-incidence sound absorption coefficient, and subjected to measurement in the frequency range of 500 to 5000 Hz.

Figure 5:
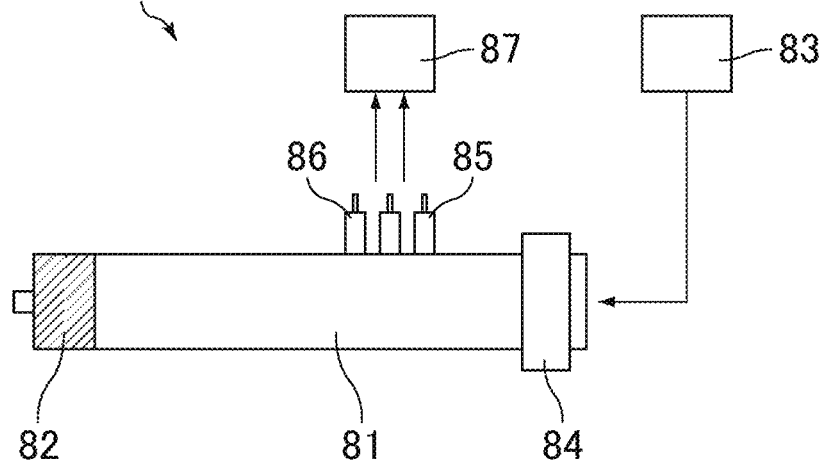
FIG. 5 is a schematic diagram of a measurement device for the normal-incidence sound absorption coefficient of a sound-absorbing material.

FIG. 5 is a schematic diagram of a measurement device for the normal-incidence sound absorption coefficient of the sound-absorbing material.

In a measurement device 80, a sample 82 is placed at an edge of an impedance tube 81. Noise is generated from a speaker 84 by a signal from a noise generator 83, and a sound field is generated inside the impedance tube 81. Then, sound pressure signals of two ¼-inch microphones 85 and 86 are analyzed by fast Fourier transform (FFT) using an FFT analyzer 87, and the normal-incidence sound absorption coefficient is calculated.

In this measurement, each sound-absorbing material was placed with its inorganic layer facing the speaker 84.

Figure 6:
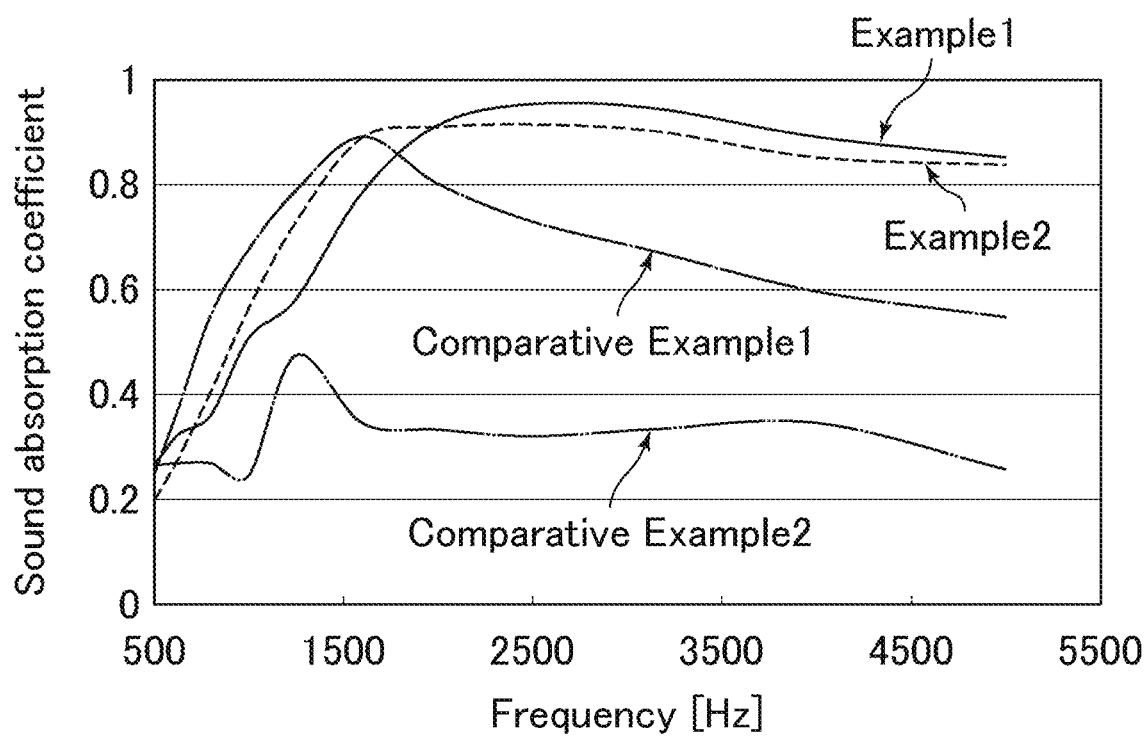
FIG. 6 is a chart of sound absorption coefficient measured using sound-absorbing materials according to examples and comparative examples.

FIG. 6 shows the results.

FIG. 6 is a chart of sound absorption coefficient measured using the sound-absorbing materials according to the examples and the comparative examples.

In FIG. 6, the vertical axis is the sound absorption coefficient, and the horizontal axis is the frequency.

The average sound absorption coefficients of the sound-absorbing materials according to the examples and comparative examples in the frequency range of 800 to 5000 Hz were calculated. Table 1 shows the results.

TABLE 1

|  | Presence or absence of holes | Thickness of inorganic material layer (mm) | Average sound absorption coefficient in 800 to 5000 Hz |
| --- | --- | --- | --- |
| Example 1 | Present | 0.4 | 0.75 |
| Example 2 | Present | 0.6 | 0.78 |
| Comparative Example 1 | Present | 1.0 | 0.69 |
| Comparative Example 2 | Absent | 1.0 | 0.32 |

As shown in FIG. 6 and Table 1, the sound-absorbing materials according to Examples 1 and 2 each achieved an excellent sound absorption coefficient in the frequency range of 800 to 5000 Hz and a sufficiently high average sound absorption coefficient.

As shown in FIG. 6, the sound-absorbing material according to Comparative Example 1 achieved an excellent sound absorption coefficient in the frequency range of 800 to 2000 Hz, but failed to achieve a sufficient sound absorption coefficient in the frequency range of 2000 to 5000 Hz.

Presumably, this is because the percentage of the sound reflected from the surface of the sound-absorbing material was high because of the excessive thickness of the high-density layer of the sound-absorbing material.

As shown in FIG. 6 and Table 1, the sound-absorbing material without holes according to Comparative Example 2 had a low sound absorption coefficient in the frequency range of 800 to 5000 Hz.

REFERENCE SIGNS LIST 10, 110, 410 sound-absorbing material
20, 120, 220, 320, 420 fiber layer
121 first fiber layer
122 second fiber layer
30, 130, 230, 330, 430 hole
31, 431 surface of fiber layer
32, 132, 432 bottom
135 through-hole
40, 140, 440 inorganic material layer
80 measurement device
81 impedance tube
82 sample
83 noise generator
84 speaker
85, 86 microphone
87 FFT analyzer

The invention claimed is:

1. A sound-absorbing material comprising:
a fiber layer including a plurality of holes open to a surface thereof and having a thickness of 3 mm or more; and
an inorganic material layer mainly containing a calcium-based material and having a thickness of 0.4 to 0.6 mm on the surface of the fiber layer,
the holes being blind holes each penetrating through the inorganic material layer and having a bottom inside the fiber layer,
each hole having a depth corresponding to 50 to 90% of the thickness of the fiber layer,
wherein, in a plan view of the sound-absorbing material, a shape and size of portions of the holes that penetrate the inorganic material layer is a same as a shape and size of portions of the holes in the fiber layer, and
each of the holes has the same shape and size.

2. The sound-absorbing material according to claim 1, wherein the fiber layer has a thickness of 3 to 50 mm.

3. The sound-absorbing material according to claim 1, wherein the fiber layer comprises a stack of two or more fiber layers.

4. The sound-absorbing material according to claim 1, wherein the fiber layer comprises inorganic fibers.

5. The sound-absorbing material according to claim 4, wherein the inorganic fibers consist of at least one type of inorganic fibers selected from the group consisting of alumina fibers, alumina-silica fibers, silica fibers, glass wool, and rock wool.

6. The sound-absorbing material according to claim 1, wherein the area of the open end of each hole is 0.20 to 15 mm2.

7. The sound-absorbing material according to claim 1, wherein the sound-absorbing material has an average sound absorption coefficient of 0.70 or more in the frequency range of 800 to 5000 Hz.

8. The sound-absorbing material according to claim 1, wherein the sound-absorbing material is used in or around any of an engine, an engine room, a vehicle body, or an exhaust pipe.

* * * * *